US008009090B2

(12) United States Patent
Vishin et al.

(10) Patent No.: US 8,009,090 B2
(45) Date of Patent: Aug. 30, 2011

(54) SYSTEM AND METHOD FOR DYNAMIC VOLTAGE SCALING IN A GPS RECEIVER

(75) Inventors: Sanjay Vishin, Sunnyvale, CA (US); Steve Gronemeyer, Cedar Rapids, IA (US)

(73) Assignee: SiRF Technology, Inc., San Jose, CA (US)

( * ) Notice: Subject to any disclaimer, the term of this patent is extended or adjusted under 35 U.S.C. 154(b) by 232 days.

(21) Appl. No.: 12/435,591

(22) Filed: May 5, 2009

(65) Prior Publication Data

US 2010/0283680 A1    Nov. 11, 2010

(51) Int. Cl.
*G01S 19/24* (2010.01)
(52) U.S. Cl. .................................................. 342/357.63
(58) Field of Classification Search ............. 342/342.12, 342/357.63
See application file for complete search history.

(56) References Cited

U.S. PATENT DOCUMENTS

| | | | | |
|---|---|---|---|---|
| 6,570,533 | B2 * | 5/2003 | Syrjarinne et al. | 342/357.63 |
| 6,608,589 | B1 * | 8/2003 | Devereux et al. | 342/357.29 |
| 6,642,884 | B2 * | 11/2003 | Bryant et al. | 342/357.64 |
| 2005/0140545 | A1 * | 6/2005 | Subbarao et al. | 342/357.12 |
| 2008/0148273 | A1 * | 6/2008 | Huang et al. | 718/104 |

OTHER PUBLICATIONS

Luca Benini and Giovanni De Micheli, "System-Level Power Optimization: Techniques and Tool"; ACM Transaction on Design Automation of Electronic Systems, vol. 5, No. 2, Apr. 2000, pp. 115-192.
Thomas D. Burd and Robert W. Brodersen, "Design Issues for Dynamic Voltage Scaling"; ISLPED 2000, Rapallo, Italy; ACM 1-58113-190-9/00/0008.

\* cited by examiner

*Primary Examiner* — Thomas Tarcza
*Assistant Examiner* — Frank McGue
(74) *Attorney, Agent, or Firm* — Haynes and Boone, LLP

(57) ABSTRACT

Systems and methods are disclosed herein to dynamically vary supply voltages and clock frequencies, also known as dynamic voltage scaling (DVS), in GPS receivers to minimize receiver power consumption while meeting performance requirements. For the baseband circuitry performing satellite acquisition and tracking, supply voltages and clock frequencies to the baseband circuitry are dynamically adjusted as a function of signal processing requirements and operating conditions for reducing baseband power consumption. Similarly, the supply voltage and clock frequency to the processor running navigation software and event processing are dynamically adjusted as a function of navigation performance requirements and event occurrences to reduce processor power consumption.

54 Claims, 6 Drawing Sheets

A GPS System with DVS

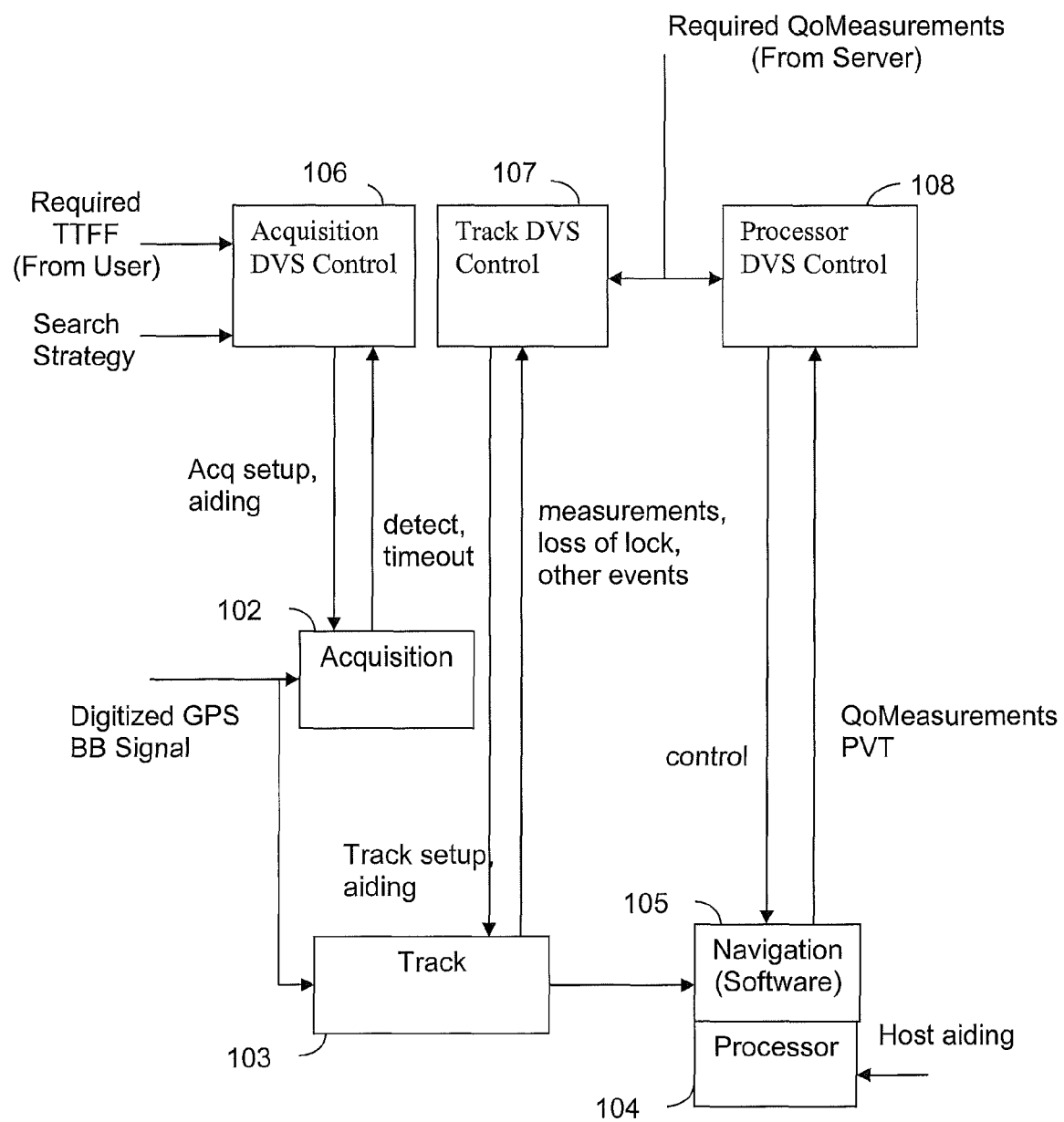
Fig. 1 A GPS System with DVS

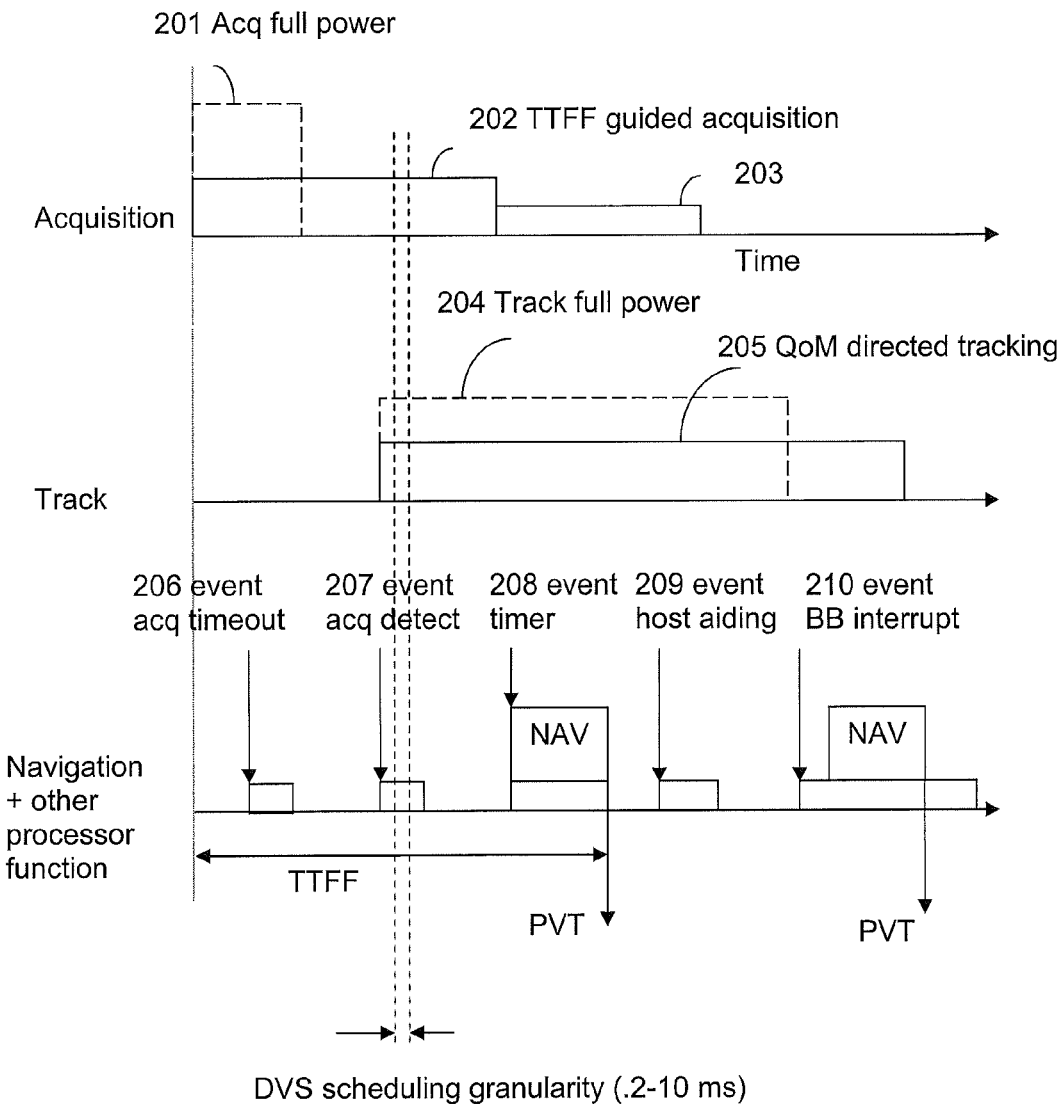
FIG. 2 Loading Profile of Acquisition, Track, Processor

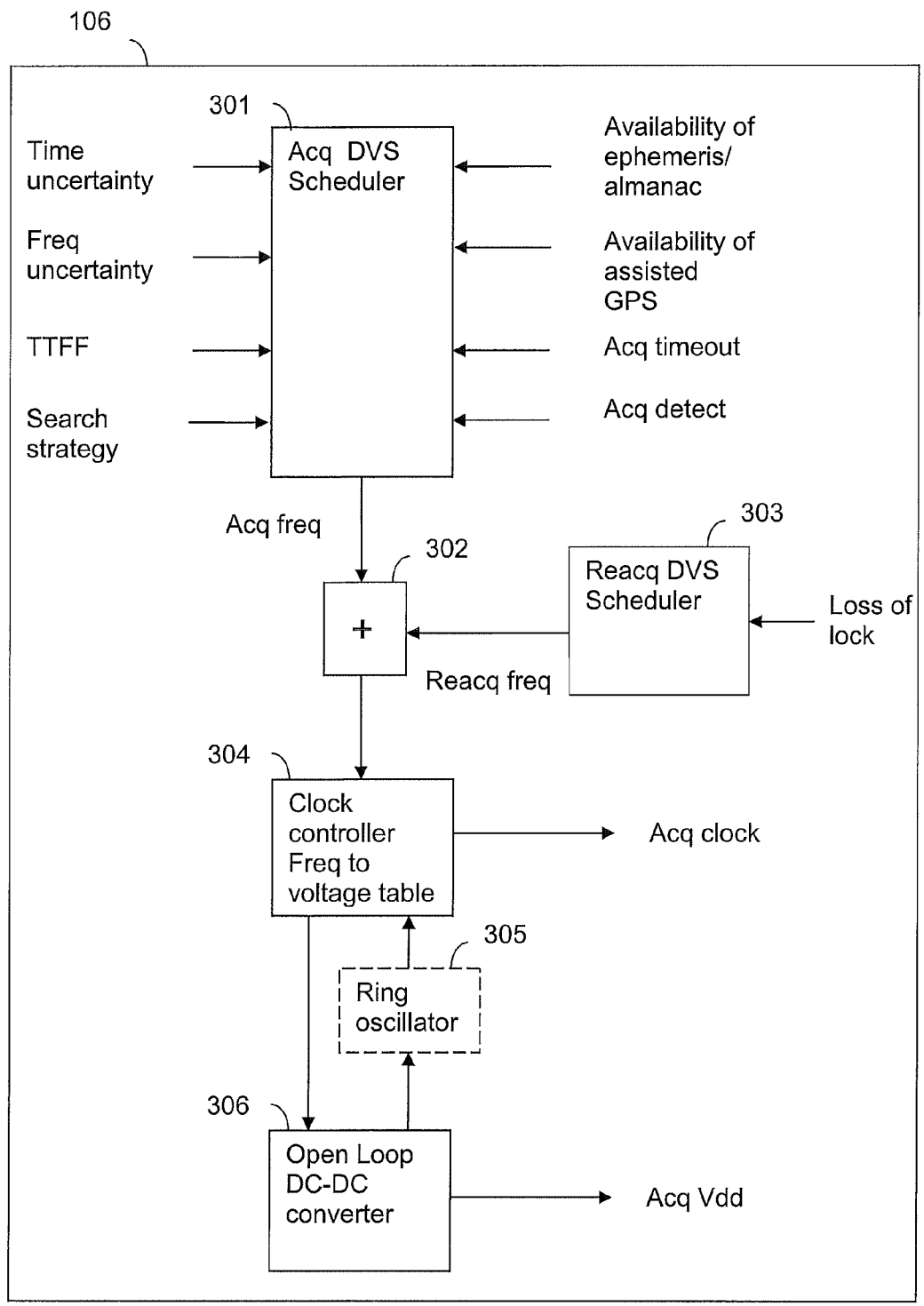
FIG. 3 Acquisition DVS control for acquisition/reacquisition

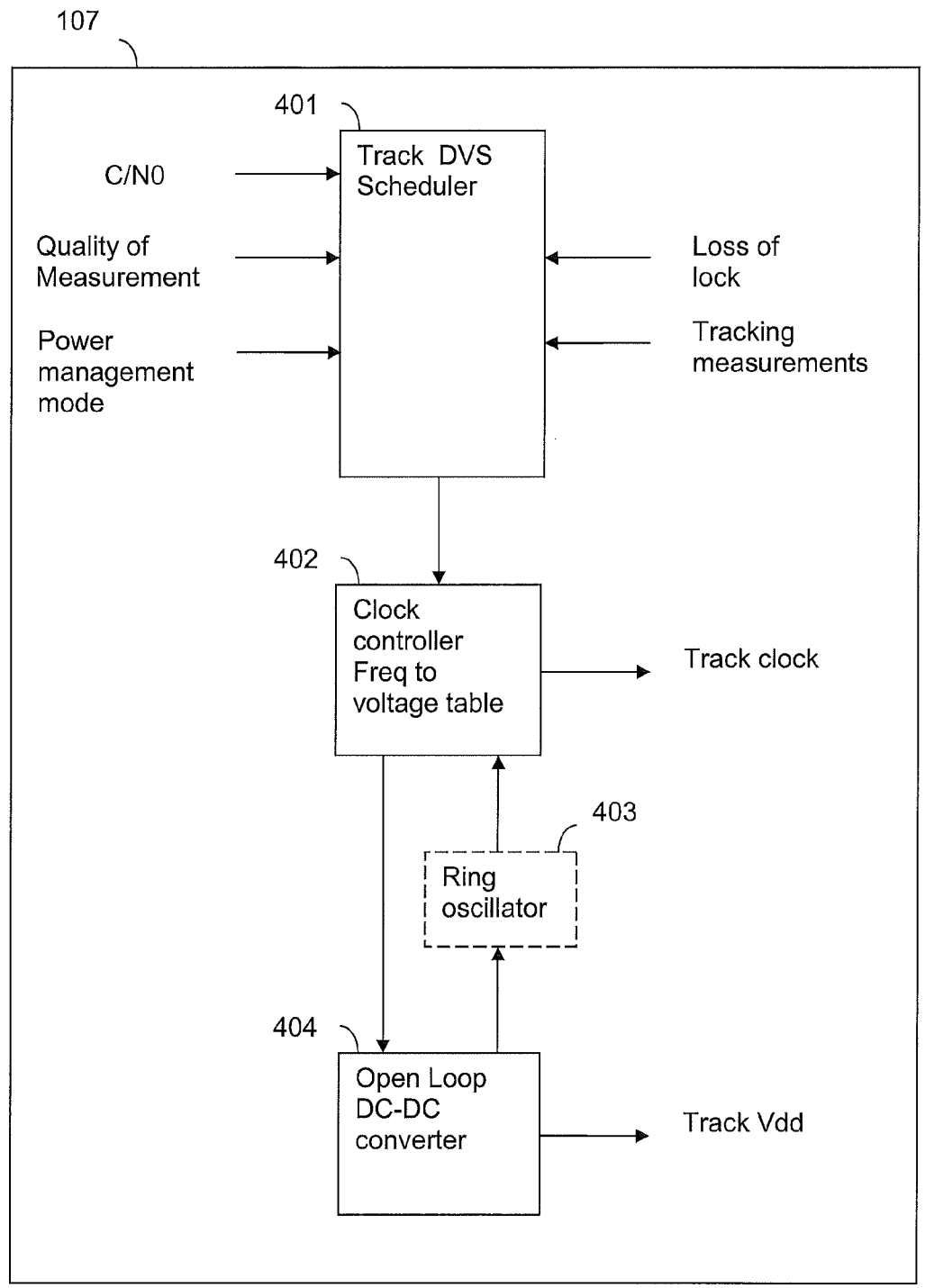
FIG. 4 Track DVS control for track channels

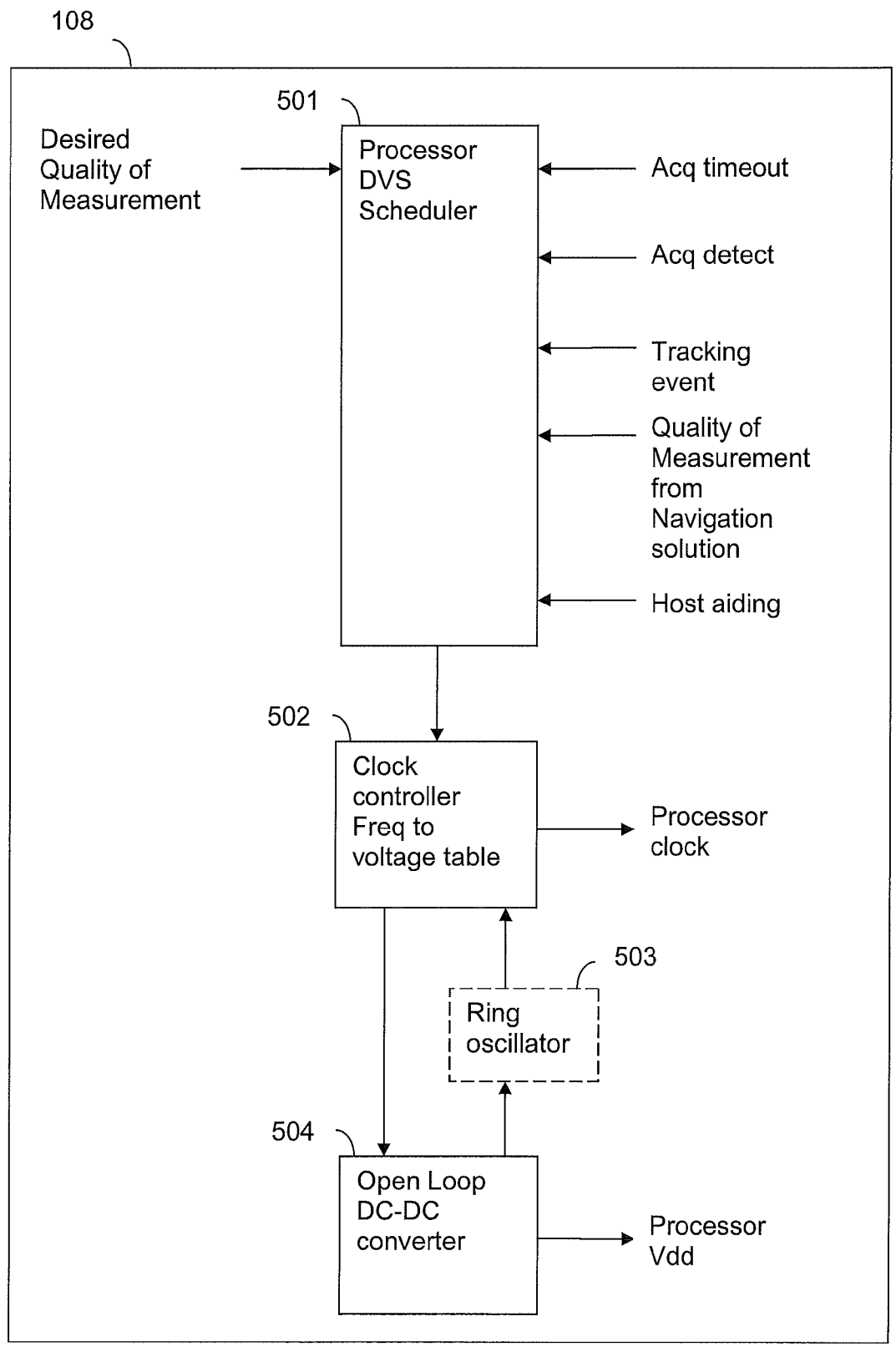
FIG. 5 Processor DVS control for processor

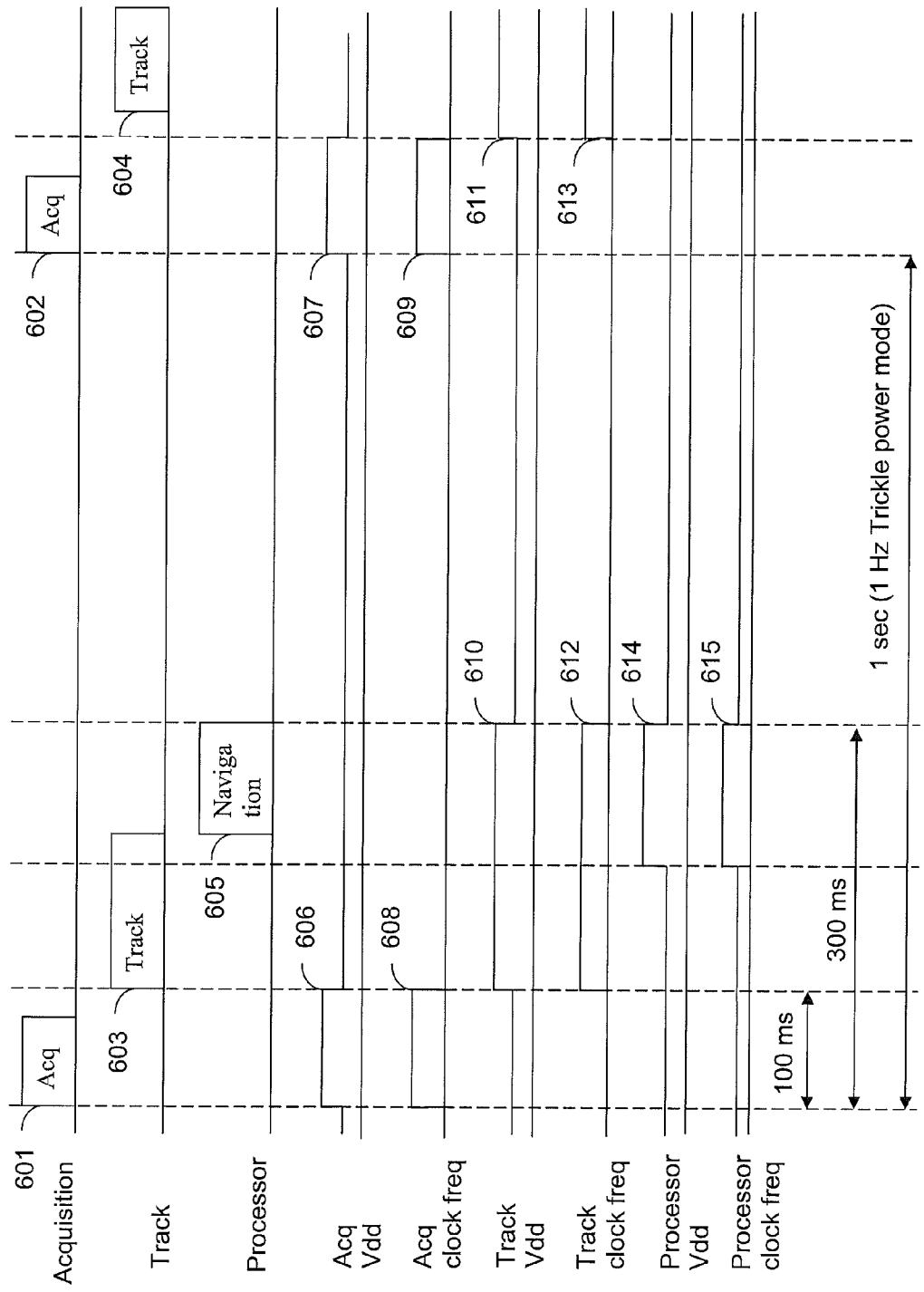
FIG. 6 DVP in Trickle power mode

SYSTEM AND METHOD FOR DYNAMIC VOLTAGE SCALING IN A GPS RECEIVER

TECHNICAL FIELD

The present disclosure relates generally to a system and a method for reducing power consumption in a satellite navigation receiver. Specifically, the present disclosure relates to a system and a method for dynamically changing supply voltage to the baseband and processor of a satellite navigation receiver to minimize dynamic power.

BACKGROUND

Satellite-based positioning systems include constellations of earth orbiting satellites that constantly transmit orbit information and ranging signals to receivers. An example of a satellite-based positioning system is the Global Positioning System (GPS), with its constellations of GPS satellites. Orbit information and ranging signals transmitted by the GPS satellites are received by GPS receivers. To determine a position, a GPS receiver acquires and tracks satellite signals from three or more GPS satellites to measure its range to the satellites and to demodulate the transmitted orbit information. The architecture of GPS receivers typically has a baseband circuitry to perform the acquisition and tracking of the satellite signals. A GPS receiver also has a processor running navigation software to calculate the receiver position using the measured range and the demodulated satellite orbit information. With increasing integration of GPS receivers into handheld devices such as cellular phones and with GPS receivers operating in ever more challenging signal environment, there is increasing demand for GPS receivers with higher performance and lower power consumption. Conventionally, GPS receivers aim to reduce dynamic power consumption by reducing frequencies of the clocks to the baseband circuitry and the processor. Since dynamic power of CMOS (complementary metal oxide semiconductor) transistors used in digital integrated circuits is a linear function of the CMOS switching frequency, reducing clock frequency reduces dynamic power by the ratio of the frequency reduction relative to the full speed clock. Alternatively, power saving may be realized by running the clock at full speed and then shutting off the clock. This clock gating technique yields power saving that is approximately linear with respect to the duty cycle of the clock being turned off. While both of these techniques are effective in reducing dynamic power to some extent, they have not been optimized for greater power saving because they only manipulate the clock, which is only one variable, in a multi-variable optimization problem.

Dynamic voltage scaling (DVS) is a technique that reduces power consumption by varying the supply voltage as a function of performance requirements. Since CMOS gate switching delay is inversely related to the supply voltage, a change in the supply voltage may also necessitate a change to the clock frequency. Power consumption of CMOS circuitry is a function of both the supply voltage and the switching frequency. DVS seeks to reduce power consumption by operating both the supply voltage and the clock frequency at the lowest level needed to meet system performance requirements. Thus, by lowering both the supply voltage and the clock, DVS is able to achieve greater power saving than that achieved by reducing the clock frequency alone. While DVS has been implemented in processor design for applications where the processor loading requirement is predictable, it has been difficult to adopt DVS in real time signal processing environments such as those encountered by GPS receivers.

Therefore, it is desirable to find ways to implement DVS in the baseband and processor of GPS receivers to realize greater power reduction while also meeting stringent real time signal processing and processor throughput requirements of GPS receivers operating in challenging signal conditions.

BRIEF SUMMARY

Systems and methods are disclosed herein to dynamically vary supply voltages and clock frequencies, also known as dynamic voltage scaling (DVS), in GPS receivers to minimize receiver power consumption while meeting performance requirements. For the baseband circuitry performing satellite acquisition and tracking, supply voltages and clock frequencies to the baseband circuitry are dynamically adjusted as a function of signal processing requirements and operating conditions for reducing baseband power consumption. Similarly, the supply voltage and clock frequency to the processor running navigation software and event processing are dynamically adjusted as a function of navigation performance requirements and event occurrences to reduce processor power consumption.

In accordance with one or more embodiments of the present disclosure, a dynamic voltage scaling (DVS) system for a satellite-based navigation receiver includes an acquisition module being clocked with an acquisition clock frequency and powered by an acquisition supply voltage to acquire a navigation satellite signal with respect to a code phase/Doppler frequency search space, and an acquisition DVS control module to dynamically adjust the acquisition supply voltage and the acquisition clock frequency to minimize receiver power as a function of the performance requirements for the acquisition module, the operating conditions of the satellite-based navigation receiver, and the status from the acquisition module.

In accordance with one or more embodiments of the present disclosure, a dynamic voltage scaling (DVS) system for a satellite-based navigation receiver includes a track module being clocked with a track clock frequency and powered by a track supply voltage to track an acquired navigation satellite signal, and a track DVS control module to dynamically adjust the track supply voltage and the track clock frequency to minimize receiver power as a function of the performance requirements for the track module, the operating conditions of the satellite-based navigation receiver, and the status from the track module In accordance with one or more embodiments of the present disclosure, a dynamic voltage scaling (DVS) system for a satellite-based navigation receiver includes a processor being clocked with a processor clock frequency and powered by a processor supply voltage to receive measurements from a track module and to execute a navigation algorithm to generate a navigation solution, and a processor DVS control module to dynamically adjust the processor supply voltage and the processor clock frequency to minimize receiver power as a function of the performance requirements for the navigation algorithm.

In accordance with one or more embodiments of the present disclosure, a method for dynamically reducing power consumption in a satellite-based navigation receiver includes allocating an acquisition time for acquiring a navigation satellite signal from performance requirements of the receiver, calculating a code phase/Doppler frequency search space as a function of operating conditions for searching the navigation satellite signal, monitoring a status of the acquisition process to adjust the allocated acquisition time and the code phase/

Doppler frequency search space, estimating processing requirements of the acquisition process as a function of the adjusted allocated acquisition time and the adjusted code phase/Doppler frequency search space, adjusting dynamically frequency of a clock for clocking the acquisition process with a minimal clock frequency, and deriving a minimal supply voltage from the minimal clock frequency to dynamically adjust a supply voltage for powering the acquisition process.

In accordance with one or more embodiments of the present disclosure, a method for dynamically reducing power consumption in a satellite-based navigation receiver includes determining a required number of navigation satellite signals to track in a track process from a quality of measurement (QoM) requirement of a navigation solution, updating the required number of navigation satellite signals to track as a function of operating conditions of the receiver and a status of the track process, estimating processing requirements of the track process from the updated required number of navigation satellite signals to track to dynamically adjust a minimal clock frequency to clock the track process, and deriving a minimal supply voltage from the minimal clock frequency to dynamically adjust a supply voltage for powering the track process.

In accordance with one or more embodiments of the present disclosure, a method for dynamically reducing power consumption in a satellite-based navigation receiver includes estimating a minimal navigation algorithm clock frequency to clock a processor to execute a navigation algorithm to generate a navigation solution as a function of a required quality of measurement (QoM) of the navigation solution, estimating a minimal baseband processing clock frequency to clock the processor to service requests from the baseband, estimating a minimal host interface processing clock frequency to clock the processor for executing host interface processing, summing the minimal navigation algorithm clock frequency, the minimal baseband processing clock frequency, and the minimal host interface processing clock frequency to generate a minimal processor clock frequency, adjusting dynamically frequency of a clock for clocking the processor with the minimal processor clock frequency, and deriving a minimal supply voltage from the minimal processor clock frequency to dynamically adjust a supply voltage for powering the processor.

These and other embodiments of the present disclosure will be more fully understood by reference to the following detailed description when considered in conjunction with the following drawings.

BRIEF DESCRIPTION OF THE DRAWINGS

FIG. 1 shows a top level block diagram of a GPS receiver running DVS according to one or more embodiments of the present disclosure;

FIG. 2 shows processing profiles of the acquisition, tracking and processor modules running DVS to acquire, track, and generate navigation solutions according to one or more embodiments of the present invention;

FIG. 3 shows a block diagram of the acquisition DVS control module implementing DVS to control satellite acquisition and reacquisition according to one or more embodiments of the present disclosure;

FIG. 4 shows a block diagram of the track DVS control module implementing DVS to control satellite tracking according to one or more embodiments of the present disclosure;

FIG. 5 shows a block diagram of the processor DVS scheduler implementing DVS to control processor clock and voltage according to one or more embodiments of the present disclosure;

FIG. 6 shows a timing/processing profile of the acquisition, track and processor modules running DVS in the trickle power mode according to one or more embodiments of the present disclosure;

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed for using DVS in GPS receivers to reduce receiver power consumption while also meeting performance requirements. GPS receivers conventionally have a baseband subsystem and a processor to carry out processing required for determining a navigation solution. The baseband subsystem performs acquisition and tracking of satellite signals to make range measurements to the satellites. The baseband subsystem also performs demodulation of satellite data to obtain satellite orbital information. The processor runs navigation software using the range measurements and the satellite orbital information obtained by the baseband subsystem to generate a navigation solution. In addition, the processor may run firmware to control the baseband subsystem and may also interface with an external host processor. The baseband subsystem and processor are generally implemented in a CMOS process where dynamic power of the circuitry is proportional to the square of the supply voltage (Vdd) as well as proportional to the CMOS switching frequency. Therefore, to minimize power consumption, it is desirable to run the baseband subsystem and the processor at the lowest possible supply voltage and at the lowest clock frequency required to support the processing requirements. Embodiments of the present disclosure dynamically adjust various supply voltages and clock frequencies by estimating the processing requirements of the baseband subsystem and the processor. Processing requirements for the acquisition and tracking functions of the baseband subsystem may be estimated based on the desired performance level and the operating signal conditions. Processing requirements for the processor may be estimated based on the desired quality of measurement for the navigation solution and on predicted occurrences of events from the baseband subsystem and from any external host processor. In addition to implementing DVS in active mode, embodiments of the present disclosure also adapts DVS for low power mode to yield additional power reduction. By estimating processing requirements and dynamically adjusting supply voltages and clock frequencies in accordance therewith, embodiments of the present invention achieves significant power saving while meeting stringent performance requirements in GPS receivers.

FIG. 1 shows a top level block diagram of a GPS receiver running DVS according to one or more embodiments of the present disclosure. The GPS receiver includes an acquisition DVS control module 106, an acquisition module 102, a track DVS control module 107, a track module 103, a processor DVS control module 108, and a processor 104 running navigation software 105. The acquisition DVS control module 106, the track DVS control module 107, and the processor DVS control module 108 estimate the processing requirements for the acquisition module 102, the track module 103 and the processor 104, respectively, and configure the voltages, clock frequencies, and other controls for their operation. The acquisition module 102 and the track module 103 process digitized baseband signal received from the RF front-end and together make up the baseband subsystem. The acquisition module 102 performs the initial acquisition of GPS satellites and may also perform the subsequent reacquisition of GPS satellites if the GPS satellites are out of track. After satellites are acquired, the track module 103 or the acquisition module 102 may verify the acquisition and, if the verification is successful, the track module 103 will track the satellites to make range measurements to the satellites. Baseband subsystem then demodulates satellite orbital information from the tracked satellite signal. The processor uses the range measurements and the demodulated orbital information from the baseband subsystem and runs the navigation software 105 to generate a navigation solution for the GPS receiver. The GPS receiver running DVS may be embedded in a PND (Personal Navigation Device), cellular phone, PDA (Personal Digital Assistant), or other mobile or portable devices where minimization of power consumption to prolong battery life is critical.

Transmission of GPS satellite signal is modulated by a satellite-specific 1023-chip pseudo-random number (PRN) code that is repeated every millisecond. At the GPS receiver, code phase of the received satellite signal is delayed by an amount corresponding to the time it takes for the signal to travel from the satellite to the receiver. The received satellite signal at the baseband subsystem is also frequency shifted by a Doppler frequency introduced due to the relative motion between the satellite and the GPS receiver and also due to a receiver oscillator error. The acquisition module 102 acquires a satellite by searching for the satellite's PRN code in a two-dimensional search space of PRN code phase and carrier frequency uncertainties. Acquisition may be performed by using multiple search channels to search for satellite signal in parallel with each search channel searching for a specified range of PRN code phase and frequency offset. Acquisition performance is measured by the time it takes for the search channels to resolve the satellite's code phase and carrier frequency uncertainties. As such, acquisition performance is a function of the size of the two-dimensional search range, the number of parallel search channels used, and the signal condition, among other factors. For example, using many parallel search channels to search for a satellite signal with high signal strength and narrow code phase/frequency uncertainties will yield faster acquisition time than using a smaller number of search channels to search for a low strength signal with large code phase/frequency uncertainties. Acquisition search strategy involves determining the code phase/frequency uncertainty range to search, the number of search channels to use, what sub-range within the uncertainty range to search if the total uncertainty range is wider than the range that may be accommodated by the search channels, the length of time to search, how to step through the sub-range if search is not successful, etc. Acquisition module 102 also needs to acquire a sufficient number of satellites for the processor 104 to calculate the receiver's position, velocity, and time in the navigation solution. In addition, each satellite has its own range of code phase/frequency uncertainties. Therefore, acquisition search strategy also involves identifying which of the satellites within the line-of-sight to acquire and determining the satellite search sequence from information known about the satellites.

In one embodiments of the present invention, the acquisition module 102 may have a single matched filter to search over the specified range of code phase and frequency offset uncertainties of a satellite. The matched filter may be time shared by a maximum of 32 logical search channels. Therefore, acquisition involves time multiplexing the single matched filter between multiple logical search channels by using a matched filter clock whose frequency is scaled up from the basic matched filter clock frequency by the number of multiplexed search channels. For example, if the basic clock frequency for the matched filter is 3 MHz and if 32 search channels are used, the matched filter clock is multiplied up to 96 MHz. The matched filter would run using the 96 MHz clock so that all 32 search channels may time share the single matched filter. The higher the number of search channels used, the higher is the clock frequency required for the matched filter. Conversely, the lower the number of search channels, the lower is the clock frequency. As an example, if the number of search channels is 16, then the matched filter clock only needs to run at 48 MHz, which is half the full speed of 96 MHz. The reduced clock speed also allows a reduction to the supply voltage by taking advantage of the inverse relationship between the intrinsic gate switching delay of CMOS circuitry and the supply voltage. For example, with the clock running at half speed, the timing requirement for gate switching speed may be relaxed, allowing the supply voltage to be reduced to 70% of full Vdd. Since CMOS dynamic power is proportional to the square of the supply voltage as well as being proportional to the CMOS switching frequency, running the clock at half speed and the supply voltage at 0.7 Vdd reduces the acquisition dynamic power to a quarter of full power. For comparison, the conventional technique of running the clock at half speed but still keeping the supply voltage at full Vdd only reduces dynamic power to a half of full power. Therefore, a GPS receiver may use DVS to minimize dynamic power during acquisition by minimizing the number of acquisition search channels. The task of the acquisition DVS control module 106 is then to determine the fewest number of search channels to use that will satisfy the acquisition performance requirement.

Acquisition DVS control module 106 generates the appropriate search strategy and determines the number of search channels to use to acquire the satellites. The number of search channels is then used to determine the clock frequency and the supply voltage for the acquisition module 102. A common performance metric for GPS receivers is the Time-To-First-Fix (TTFF) which measures the time from a start of acquisition to a first navigation solution. From the desired TTFF, a maximum time may be determined for the acquisition module 102 to acquire the minimum 4 satellites required for the navigation solution. The acquisition DVS control module 106 may then analyze the maximum acquisition time to allocate an acquisition time for each satellite. From the allocated acquisition time, an estimated search time for each search channel as determined from an estimated received signal strength, the range of code phase/frequency uncertainties searched by each search channel, and the total code phase/frequency search range associated with each satellite, the acquisition DVS control module 106 may determine the number of search channels to use for each satellite. For example, the number of search channels for a satellite may be the estimated search time for each search channel multiplied by the total code phase/frequency search range for the satellite divided by the search range for each search channel and further divided by the allocated acquisition time. The acquisition DVS control module 106 may then multiply the number of search channels thus found by the basic matched filter frequency to derive the frequency for the acquisition clock, and from the clock frequency determine the minimum supply voltage that will support the acquisition clock frequency. To run acquisition, the acquisition DVS control module 106 configures each search channel of the acquisition module 102 to search over a sub-range of the code phase/frequency search range of the PRN code of the satellite for a specified search time, and also provides the acquisition clock and the supply voltage. The acquisition module 102 runs the acquisition process using the configured search channels and, at the end of the search time, reports back either the detected code phase and frequency offset of the satellite signal when it has detected the signal, or reports no detection when the acquisition times out at the end of the specified search time. In one or more embodiments, the acquisition DVS control module 106 may be implemented in software running on the processor 104. In other embodiments, parts of the acquisition DVS control module 106 may be implemented in hardware.

The acquisition DVS control module 106 may dynamically adjust the number of search channels by monitoring the status of the acquisition process reported by the acquisition module 102 as the acquisition module 102 searches through the sequence of satellites to be searched. For example, if the acquisition module 102 fails to acquire the first satellite on a first pass through the code phase/frequency search range due to degraded satellite signal strength, the search time for each search channel may have to be increased to increase the probability of detect on a second pass. Increasing the search time for each search channels may necessitate an increase in the number of search channels even if the allocated acquisition time for the satellite is kept the same. Most likely, however, the allocated acquisition time for the second pass may have to be reduced since part of the allocated acquisition time has already been used in the failed first pass, requiring a further increase in the number of search channels. Conversely, an unexpectedly fast acquisition of one satellite may allow the acquisition DVS control module 106 to reduce the number of search channels used for searching subsequent satellites since the allocated acquisition time for the subsequent satellites may be increased. In addition, as more satellites are acquired, the GPS receiver is able to obtain a better estimate of the oscillator frequency error. Since oscillator frequency error is a major component of the Doppler frequency uncertainty, a better estimate of the oscillator frequency error may reduce the range of frequency uncertainty to search when searching the subsequent satellites. A reduced frequency uncertainty range may then allow for a reduction in the number of required search channels. Therefore, as the acquisition module 102 acquires more satellites, acquisition DVS control module 106 may be able to reduce the number of search channels used to search the subsequent satellites.

After an initial acquisition of a satellite, either the acquisition module 102 or the track module 103 may be used to verify the initial acquisition or any other earlier acquisition of the satellite. Verifying the acquisition of a satellite involves trying to reacquire the satellite at the same code phase and frequency offset as those found from the earlier acquisition. Acquisition verification aims to reduce the probability that the earlier acquisition was a false acquisition before handing off the acquired satellite to the track module 103 for tracking. Acquisition verification using DVS may be carried out using the matched filter of the acquisition module 102 in the same way as the initial acquisition using DVS. Acquisition verification may also be carried out using the matched filter of the track module 103. When using the acquisition module 102 for acquisition verification, in one or more embodiments, the matched filter may also be time shared by multiple logical verification channels with the logical verification channels working together to verify the acquisition of one or more satellites. The code phase/frequency search range for the acquisition verification may be different from that used for the initial acquisition. Therefore, the number of logical verification channels may be different from the number of logical search channels used for the initial acquisition of the same satellite. Initial acquisition and acquisition verification of satellites may also proceed in parallel so that acquisition module 102 may search for one satellite while verifying the acquisition of one or more other satellites. In one or more embodiments, acquisition module may also search for more than one satellite while verifying the acquisition of other satellites. Regardless of how many satellites are in acquisition and how many are in verification, the total number of multiplexed channels in the acquisition module 102 is the sum of all the logical search channels for satellite acquisition and of all the logical verification channels for acquisition verification. The task of the acquisition DVS control module 106 is to determine the fewest number of search and verification channels to use that will satisfy acquisition performance requirements.

After the acquisition module 102 acquires a satellite and either the acquisition module 102 or the track module 103 verifies the acquisition, the track DVS control module 107 may configure the track module 103 to track the satellite. Tracking a satellite involves using a matched filter to track changes in the code phase, the Doppler frequency, and the carrier phase of a satellite as the satellite moves through its orbit. The matched filter in the track module 103 may have the same structure as the matched filter used in the acquisition module 102. In one or more embodiments, the acquisition and track module may share the same matched filters. In other embodiments, the track module may have a separate matched filter of its own. Similar to the way the acquisition module 102 time-multiplexes the single matched filter between multiple logical search channels and/or logical verification channels, the matched filter in the track module 103 may also be time shared between logical tracking channels and logical verification channels, where each logical tracking channel tracks one satellite. In addition, similar to the acquisition matched filter clock, the frequency for the tracking matched filter clock is also scaled up by the number of tracking channels to enable time multiplexing of the tracking matched filter. Similarly, the supply voltage to the track module 103 is adjusted as a function of the number of tracking channels. Therefore, as in the acquisition module, GPS receiver may use DVS to minimize dynamic power during tracking by minimizing the number of tracking channels. The task of the track DVS control module 107 is to determine the fewest number of tracking channels to use to satisfy tracking performance requirements. In one or more embodiments, the track DVS control module 107 may be implemented in software running on the processor 104. In other embodiments, parts of the track DVS control module 107 may be implemented in hardware.

From the tracked satellite signal, the baseband may demodulate transmitted satellite data containing information such as the satellite orbital information. The tracked satellite signals also provide information on the relative range and velocity between the satellites and the GPS receiver based on measured code phase delays and carrier frequency offset. For the GPS receiver to generate a navigation solution including three-dimensional position, velocity and time, a minimum of four satellites have to be tracked. Often, it is desirable to track more than four satellites because the geometry of the satellites influences the quality of the navigation solution. By tracking more than the minimum set of four satellites, the navigation solution may yield better quality solutions. In addition, some of the tracked satellites may lose lock as the line-of-sight to the satellites are temporarily blocked, when the satellites are no longer in view, or as changes in the code phase or the carrier frequency of the received signal exceed the capabilities of the track module to track them. Just as the acquisition DVS control module 106 uses TTFF as an acquisition performance metric to help determine the number of search channels to use, the track DVS control module 107 may use a user specified Quality of Measurement (QoM) as a tracking performance metric to determine the number of tracking channels to use. The QoM may be a quantitative measure of the robustness of the navigation solution expressed, for example, as a probability that the receiver position determined from the tracking channels has an uncertainty error not exceeding a specified threshold. The relationship between the QoM and the number of tracking channels may be obtained analytically or empirically.

Additionally, the track DVS control module 107 may dynamically adjust the number of tracking channels by monitoring status of the tracking channels such as status signals indicating a loss of lock from any of the tracking channels. The track DVS control module 107 may also dynamically adjust the number of tracking channels based on signal strength by monitoring a signal to noise measurement. For example, when signal blockage or other challenging operating condition degrades the signal to noise ratio or causes one or more of the tracking channels to lose lock, the track DVS control module 107 may have to increase the number of tracking channels or to track other satellites to satisfy the QoM. To increase the number of tracking channels, the track DVS control module 107 may instruct the acquisition module 102 to acquire/reacquire additional satellites. Thus, the acquisition module 102 interacts with the track module 103 through the acquisition DVS control module 106 and the track DVS control module 107 to determine the number of acquisition channels and the number of tracking channels. That is, as the acquisition module 102 acquires a satellite, the track DVS control module 107 starts a tracking channel to track the satellite; and as a tracking channel loses lock, the acquisition DVS control module 106 may start one or more acquisition channels to acquire additional satellites. A static channel table in the track DVS control module 107 keeps track of the number of, and also information about, the tracked satellites, To configures a tracking channel in the track module 103 to track a satellite, the track DVS control module 107 initializes the matched filter with the code phase and carrier frequency obtained from the acquisition module 102 for that satellite. The tracking channel tracks the satellite, updates the code phase and the carrier frequency from tracking errors, sends status signals to the track DVS control module 107, and periodically sends updated measurements to the navigation software 105 for it to recalculate the navigation solution.

The processor 104 runs the navigation software 105 to generate the navigation solution. The processor DVS control module 108 may also be implemented as software executing on the processor 104. In addition, the processor 104 may run firmware to control the baseband subsystem, service requests from the baseband subsystem, and interface with an external host processor. Navigation solution generated by the processor 104 may also be output for display through the external host processor. In one or more embodiments, the processor 104 may be a microcontroller, a microprocessor, or other types of programmable devices. To minimize processor power, the processor DVS control module 108 may control the processor clock frequency and processor supply voltage as a function of the predicted processor loading. Since running the navigation software 105 represents the dominant loading requirement on the processor 104, the processor DVS control module 108 may achieve power saving by being able to predict the loading requirement of, and the timing for executing the navigation software. The processor loading for executing the navigation software may be predicted through an analysis of the navigation solution algorithm. The timing for executing the navigation software is known since it is synchronized with the availability of the tracking measurements. These tracking measurements, such as the range measurements and the demodulated satellite data, are provided on a periodic basis from the track module 103. In addition, the timing for executing some of the baseband firmware and the timing for servicing requests from the baseband may also be known since they may be periodic. Therefore, by having a priori knowledge of the processing requirement of the navigation software and other periodic routines running on the processor 104, the processor DVS control module 108 may run the processor 104 at the lowest clock frequency and at the lowest supply voltage to meet the processing requirements. In one or more embodiments, parts of the processor DVS control module 108 may be implemented in hardware.

Similar to the way the acquisition module 102 and the track module 103 allow for external control over their power consumption through performance metrics, it is desirable to allow external control over the power consumption of the processor by allowing a user to specify a desired level of robustness of the navigation solution. The QoM that is used by the track DVS control module 107 to determine the number of tracking channels may also be used as a navigation performance metric to determine the processor loading requirement when running the navigation software. Recall that QoM is a quantitative measure of the robustness of the navigation solution expressed, for example, as a probability that the receiver position determined from the navigation solution has an uncertainty error not exceeding a specified threshold. Generally, the better the QoM, the higher the number of satellites whose measurements are to be processed by the navigation solution, resulting in a higher processing requirement and increased power consumption. The relationship between QoM and the processor loading requirement may be determined analytically or empirically. When a user specifies a desired QoM, the processor DVS control module 108 may use the relationship between the QoM and the processor loading requirement to estimate the initial clock frequency and the initial supply voltage for use by the processor to execute the navigation software. After the processor executes the navigation software, it may also generate a calculated QoM based on an estimated error in the navigation solution. The processor DVS control module 108 monitors the calculated QoM from the navigation solution to compare it to the desired QoM, and dynamically adjusts the processor clock frequency and the supply voltage to meet the desired QoM.

FIG. 2 shows processing profiles of the acquisition, tracking and processor modules running DVS to acquire, track, and generate navigation solutions according to one or more embodiments of the present invention. There are three timing diagrams profiling processing for the initial acquisition/reacquisition of satellites, for tracking of the acquired satellites, and for running the navigation solution and other functions on the processor, as shown from top to bottom. The horizontal axis represents time. The vertical axis for the diagrams shows clock frequency and is therefore an indication of the level of dynamic power consumption.

Referring to the top acquisition diagram, for comparison purpose, processing profile 201 shows the acquisition processing without DVS when the acquisition runs at full power or full clock speed to acquire all the satellites for the navigation solution. After all the satellites have been acquired, the acquisition clock shuts off. Processing profile 202 shows the acquisition processing with DVS when it is guided by TTFF. As mentioned previously when describing FIG. 1, from the TTFF, a maximum time for acquiring the minimum 4 satellites for a navigation solution may be determined. From this maximum acquisition time, an acquisition time and the number of search channels for each satellite are also determined. Processing profile 202 shows that the total acquisition time has more than doubled as compared with the acquisition time for the full power acquisition of processing profile 201. However, the acquisition clock frequency for 202 may now run at only half of the full clock speed of 201. Running the acquisition clock at half speed allows a reduction of the acquisition supply voltage to 70% of full Vdd. Because CMOS dynamic power is proportional to the square of the supply voltage, even if the total number of clock cycles is the same between full power acquisition 201 and TTFF guided acquisition 202 under DVS, by running the acquisition at 70% of full Vdd, acquisition power for the TTFF guided acquisition 202 is now half of the full power acquisition 201. Processing profile 203 shows the clock frequency used when additional satellites beyond the minimum 4 are acquired as required by the QoM requirement or when the satellites have to be reacquired due to loss of lock from the tracking channels.

Referring to the tracking diagram in the middle of FIG. 2, 204 shows satellite tracking without DVS when the tracking channel runs at full clock speed or full power to track all the acquired satellites and then the tracking clock shuts off. 205 shows satellite tracking with DVS when it is directed by the QoM. QoM directed satellite tracking may allow the tracking channel to run at a reduced clock speed. Therefore, even if the same number of tracking channels is used and the number of clock cycles is the same between full power tracking 204 and QoM directed tracking 205, the reduced tracking clock speed of the QoM directed tracking allows a reduction in the supply voltage to the track module, resulting in lower power consumption.

The processor diagram at the bottom of FIG. 2 profiles the processor clock frequency as a function of time for the various types of processing. The diagram shows three types of processing—servicing events from the baseband, interfacing with an external host processor, and executing the navigation solution algorithm. 206 shows processor clock loading for servicing an acquisition timeout event from the acquisition module. An acquisition timeout event occurs when the acquisition module fails to detect a satellite during the allocated search time. The processor receiving the event may increase the search time and configure the acquisition module to search the same satellite with the increased search time, or may configure the acquisition module to search a different satellite. The processing requirement on the processor is light and the processor may run at a low frequency to service the event. The processor may also run at a reduced supply voltage to reduce power. After servicing the event, the processor may go into a low power mode or may shut off the clock to conserve power.

207 shows processor clock loading for servicing an acquisition detect event from the acquisition module. An acquisition detect event occurs when the acquisition module has detected a satellite. After receiving the event, the processor may configure the acquisition module to verify the acquisition, or may configure the track module to track the acquired satellite with the code phase and carrier offset obtained from the acquisition module. The processor may also configure the acquisition module to acquire a second satellite. Again, the processing requirement on the processor is light and the processor may run at a low frequency and a reduced supply voltage to service the event. The bottom of FIG. 2 also shows the DVS scheduling granularity. As mentioned before, DVS may dynamically adjust the clock frequencies and the supply voltages to the acquisition, track, and processor modules by monitoring the status of these modules. FIG. 2 shows that the granularity of DVS adjustment may be in the range 200 µs to 10 ms. Other granularity of adjustment is also possible. The granularity of adjustment may also dynamically vary to respond to changing requirements and conditions. The finer the granularity of adjustment, the more is the potential for power saving, but at a cost of a more complex voltage control circuitry to ensure low voltage transition time.

208 shows processor clock loading for servicing an event timer from the track module. The tracking event timer indicates the availability of a first set of measurements from the tracking channels for the processor to run the navigation algorithm to generate a first navigation solution. Of the three types of processing, the navigation algorithm imposes the most demanding processing requirement on the processor. Therefore, the processor clock frequency is significantly higher when the processor executes the navigation algorithm than when performing other processing. However, the processor clock and the processor supply voltage may be adjusted by DVS as a function of a desired QoM so that the processor may run at the lowest frequency and the lowest power that meet the QoM. The output of the navigation solution is an initial position, velocity, and time estimates of the receiver. As discussed earlier, TTFF is a performance metric that measures the delay from the start of acquisition to the first navigation solution and may be used by DVS to adjust the power during acquisition.

209 shows processor clock loading for servicing a request from an external host processor. As in servicing baseband requests, the processor loading requirement for servicing an external host request is low. The external host request may include transfer of aiding data to assist the GPS receiver in acquiring satellites. 210 shows processor clock loading for servicing a second event timer from the track module. The second event timer indicates the availability of a second set of measurements from the tracking channel for the processor to update the navigation solution. As before, the processor clock frequency increases to meet the increased processing requirement of the navigation algorithm. The navigation solution algorithm then outputs updated estimates of receiver position, velocity, and time. Thus, by dynamically adjusting the clock frequencies and the supply voltages to the acquisition module, the track module, and the processor, DVS achieves power reduction in the GPS receiver and at the same time meets the desired performance requirements as specified by the TTFF and the QoM.

FIG. 3 shows a block diagram of the acquisition DVS control module 106 of FIG. 1 for implementing DVS to control satellite acquisition and reacquisition according to one or more embodiments of the present disclosure. The acquisition DVS scheduler 301 determines the frequency of the clock to be used by the acquisition module. Similarly, the reacquisition DVS scheduler 303 determines the frequency of the clock to be used by reacquisition. The two frequencies are summed in 302 and used by the clock controller frequency to voltage table of 304 to generate the desired supply voltage level for the acquisition module corresponding to the clock frequency. The open loop DC-DC converter of 306 uses the desired supply voltage level to generate the actual supply voltage to the acquisition module. The actual supply voltage is also used by the ring oscillator 305 to generate the clock to the acquisition module.

The acquisition DVS scheduler 301 dynamically adjusts the desired clock frequency for running acquisition as a function of the performance requirements for the GPS receiver, the operating conditions, and the status of acquisition. In one or more embodiments of the present invention, the acquisition clock frequency is the basic clock frequency for the matched filter multiplied by the number of search channels used. As mentioned, the number of search channels may be calculated from the estimated search time for each channel multiplied by the total code phase/frequency search range divided by the search range for each search channel and further divided by the allocated acquisition time. Therefore, the total code phase/frequency search range and the allocated acquisition time affect the acquisition clock frequency.

The allocated acquisition time may be derived based on GPS receiver performance requirements. One common GPS receiver performance requirement that is used as a measure of acquisition performance is the TTFF. From the TTFF, an acquisition time to acquire the minimum set of 4 satellites for a navigation solution may be allocated by knowing the time to be allocated for tracking, for data demodulation, and for generating the navigation solution. As for determining the total code phase/frequency search range, factors that affect the total code phase/frequency search range may include operating conditions such as the amount of time uncertainty in the GPS receiver, the amount of frequency uncertainty in the received signal, the availability of ephemeris or almanac, and the availability of assisted GPS information. Time uncertainty arises because time in the GPS receiver time is not synchronized to the GPS time. The amount of time uncertainty in the GPS receiver translates into uncertainty in the range from the receiver to the satellite and thus the range of code phase uncertainty within which to search for a satellite. The amount of frequency uncertainty in the received signal is a function of the Doppler frequency due to the relative motion between the satellite and the GPS receiver and is also a function of the receiver oscillator error. Together, the time and frequency uncertainties define the total 2-dimensional acquisition code phase/frequency search range.

The amount of time and frequency uncertainties also depend on operating conditions such as the availability of the ephemeris/almanac and the availability of assisted GPS information from external sources. The ephemeris and the almanac contain information about the GPS satellites and are part of the transmitted data from the GPS satellites. The ephemeris is used to precisely determine the position of GPS satellites at any point in time within an ephemeris validity window and may be used to reduce the range uncertainty and thus the code uncertainty. The ephemeris is used by the navigation algorithm in generating the navigation solution. In addition, the ephemeris contains information such as the satellite Doppler frequency that may be used in determining the acquisition frequency uncertainty. Thus, the availability of the ephemeris not only eliminates the need to demodulate satellite data, thus allowing more time to be allocated for the acquisition, but also reduces the code phase and frequency uncertainty search range since satellite position and Doppler are known. However, the ephemeris validity window is only four to six hours long. Ephemeris data that is more than six hours old may introduce inaccuracies in the satellite position and Doppler, giving rise to errors in the navigation solution. The almanac contains less accurate information on the satellite position and Doppler than the ephemeris. Therefore, knowledge of the almanac does not enable the GPS receiver to reduce the code phase and frequency uncertainty search range as much as with the ephemeris. It also does not eliminate the need to demodulate satellite data to obtain the ephemeris. However, the almanac is valid for up to six days, much longer than the ephemeris validity window. For those times when the ephemeris is not available or is out of date, the availability of the almanac helps to reduce the acquisition time. Ephemeris and almanac may be available because they were demodulated from previous operations of the GPS receiver. Alternatively, ephemeris and almanac may also be supplied from external sources. Assisted GPS allows an external source to supply information on satellites, information on GPS receiver time, or other information to reduce the acquisition code phase and frequency uncertainty range for the GPS receiver, or to assist the GPS receiver in generating a better navigation solution.

The number of search channels calculated by the acquisition DVS scheduler 301 also depends on the code phase/frequency search range of each search channel. The code phase search range is the code aperture of each search channel, and is usually fixed by the structure of the matched filter. On the other hand, the frequency search range is inversely proportional to the search time for each channel. The longer the search time is, such as when the acquisition module tries to acquire a weak signal, the narrower is the frequency search range for each search channel, resulting in an increase in the number of search channels required, or an increase in acquisition time.

The acquisition DVS scheduler 301 also monitors the status of the acquisition process to dynamically adjust the acquisition clock frequency. As mentioned previously, if the acquisition times out because the acquisition fails to detect a satellite within the allocated search time, the acquisition DVS scheduler 301 may increase the channel search time and search the same satellite again, or may select a different satellite to search. Increasing the channel search time may also increase the number of search channels, not only due to the direct relationship between the channel search time and the number of search channels, but also due to the narrower frequency search range for each channel, thus requiring more search channels to cover the same frequency range. Conversely, when the acquisition successfully detects a satellite before the end of the allocated search time for that satellite, the allocated search time for subsequent satellites may be increased, leading to a reduction in the number of search channels used to search the subsequent satellites.

The acquisition DVS scheduler 301 also receives instructions from a search strategy algorithm that identifies which satellites to search, provides for the sequence of the search, and specifies requirements for acquisition verification and the appropriate recovery action when the satellite search is not successful. Using the TTFF requirement, the total code phase/frequency uncertainties, the availability of ephemeris/almanac or assisted GPS to reduce the total code phase/frequency search range, and the search strategy information, the acquisition DVS scheduler 301 determines the number of search channels to use for searching each satellite. The acquisition DVS scheduler 301 also monitors status of the acquisition process, and dynamically adjusts the number of search channels. The acquisition DVS scheduler 301 multiplies the basic matched filter clock frequency by the number of search channels to output the desired clock frequency for acquisition.

The reacquisition DVS scheduler 303 determines the frequency of the clock to be used by reacquisition. Reacquisition occurs when the tracking channel is not able to track a satellite and a loss of lock occurs. A loss of lock may occur as the signal from the tracked satellite is degraded, or as the changes in the code phase or carrier frequency of the received signal exceed the capabilities of the track module to track the changes. Reacquisition searches for satellites the same way as acquisition except that in reacquisition the range of code phase and frequency uncertainty to search is smaller than that of an initial acquisition. This is because the current code phase and Doppler frequency of the satellite is not expected to deviate significantly from those found before the satellite lost lock. In one or more embodiment of the present disclosure, the matched filter of the acquisition module is time multiplexed for both acquisition and reacquisition. In other embodiments, the reacquisition may be carried out in the track module, where the matched filter of the track module may be time multiplexed between tracking and reacquisition. When reacquisition is carried out in the acquisition module, the number of search channels is the sum of the number of search channels used for acquisition and for reacquisition. Similar to the acquisition DVS scheduler 301, the reacquisition DVS scheduler 303 also uses the reacquisition code phase/frequency search range, and the status of the reacquisition process to dynamically determine the number of search channels to use to reacquire each satellite. From the number of search channels for reacquisition, the reacquisition DVS scheduler 301 multiplies it by the basic matched filter clock frequency to output the desired clock frequency for use by the reacquisition process.

The desired clock frequency for acquisition is added to the desired clock frequency for reacquisition in 302. The sum represents the desired clock frequency to be used by the acquisition and reacquisition processes in the acquisition module. To realize the maximum power saving, the acquisition module should run at the lowest supply voltage that can support the desired clock frequency. This relationship between the clock and the supply voltage may be predetermined and stored in a frequency to voltage look up table in clock controller 304. The desired clock frequency is used as an input to the frequency to voltage look up table to generate the desired supply voltage to the acquisition module. The desired supply voltage may be used by the open loop DC-DC converter 306 to generate the acquisition Vdd to the acquisition module. In a closed loop system of one or more embodiments, there may be an additional ring oscillator 305 where the acquisition Vdd may also be used by the ring oscillator 305 to generate a clock frequency. The clock frequency may be fed back to the clock controller 304 and compared against the desired clock frequency to close the loop and to generate the acquisition clock to the acquisition module. Alternatively, in an open loop system of one or more embodiments, the clock controller 304 may use just the desired clock frequency to generate the acquisition clock to the acquisition module. Thus, the acquisition DVS scheduler 301 and the reacquisition DVS scheduler 303 dynamically adjust the acquisition clock and the acquisition Vdd to meet acquisition and reacquisition performance requirements with minimal power consumption.

FIG. 4 shows a block diagram of the track DVS control module 107 of FIG. 1 for implementing DVS to control satellite tracking according to one or more embodiments of the present disclosure. The track DVS scheduler 401 determines the desired frequency of the clock to be used for satellite tracking by the track module. The clock controller frequency to voltage table of 402 generates the desired supply voltage for the track module corresponding to the tracking clock frequency. The open loop DC-DC converter 404 uses the desired supply voltage to generate the actual supply voltage to the track module. The actual supply voltage is also used by the ring oscillator 403 to generate the actual clock to the track module.

Similar to the acquisition DVS scheduler, the track DVS scheduler 401 dynamically adjusts the desired clock frequency for satellite tracking as a function of the performance requirements for the GPS receiver, the operating conditions, and the status of tracking. In one or more embodiment of the present invention, the tracking clock frequency is the basic clock frequency for the tracking matched filter multiplied by the number of tracking channels used. As mentioned, one performance metric that may be used to determine the number of tracking channels is the QoM. QoM is a measure of the robustness of the navigation solution. The more robust the QoM, the higher is generally the number of tracked satellites, not only because the higher number of tracked satellites yields a higher probability of having more favorable satellite geometries for better quality navigation solutions, but also because some satellites may lose lock from degradation in the satellite signals due to operating conditions. Thus, the more satellites are tracked, the better is the ability of the navigation algorithm to withstand signal blockage when a few satellites temporarily become out of lock. One other performance requirement that may affect not only the number of tracking channels but also the basic clock frequency for the matched filter is the requirement for low power operation when operating in the power management mode. The power management mode enables satellite tracking with a low duty cycle to conserve power. Operating the power management mode under DVS may allow trade offs between the tracking duty cycle and the clock frequency for the tracking operation to allow further reductions in power consumption. For example, it may be possible to conserve power by running fewer tracking channels for a longer duty cycle using a slower tracking clock frequency than running more tracking channels for a shorter duty cycle using a higher tracking clock frequency. The track module may operate with fewer tracking channels than the number of tracked satellites because the track DVS scheduler 401 may operate the tracking channels to track one set of satellites during one portion of the active duty cycle and then operate the same tracking channels to track a second set of satellites during another portion of the active duty cycle. In addition, by lengthening the duty cycle afforded by the power management mode to provide additional flexibility in slowing down the tracking clock, DVS may lower the supply voltage to the track module to conserve power.

The track DVS scheduler 401 may also use one of the tracking channels to measure satellite signal strength and to use the satellite signal strength to dynamically adjust the number of tracking channels. For example, a tracking channel may measure the ratio of the carrier power to noise power density to output a C/N0 to the track DVS scheduler 401. When the C/N0 indicates that the signal strength is degraded such as during signal blockage, the track DVS scheduler 401 may increase the number of tracking channels to provide satellite measurements from more satellites to the navigation algorithm to compensate for the decreased signal strength. In addition, the track DVS scheduler 401 may also receive measurements from the tracking channels such as the measured code phase and the carrier frequency to monitor characteristics of the tracked satellite signals. Signals with fast changing code phase or carrier frequency that are nearing the capabilities of the tracking channel to track the changes may indicate a heightened probability of loss of lock of the tracked satellite. Again, the track DVS scheduler 401 may increase the number of tracking channels in anticipation of possibly losing the satellite signal. The track DVS scheduler 401 may also monitor the loss of lock signal from the tracking channels when the tracking channel is unable to track the satellite signal. When a loss of lock occurs, the track DVS scheduler 401 may configure the track module to track another satellite, configure the track module to reacquire the lost satellite, increase the number of tracking channels to track additional satellites, or may request the acquisition DVS scheduler 301 of FIG. 3 to reacquire the lost satellite. From the number of tracking channels, the track DVS scheduler 401 multiplies it by the basic matched filter clock frequency to output the desired clock frequency for tracking.

The relationship between the tracking clock frequency and the tracking supply voltage may be predetermined and stored in a frequency to voltage look up table in clock controller 402. Similar to the acquisition, the desired tracking clock frequency is used as an input to the frequency to voltage look up table to generate the desired supply voltage to the track module. The desired supply voltage may be used by the open loop DC-DC converter 404 to generate the track Vdd to the track module. In a closed loop system in one or more embodiments, there may be an additional ring oscillator 403 where the track Vdd may also be used by the ring oscillator 403 to generate a clock frequency. The ring oscillator clock may be fed back to the clock controller 402 and compared against the desired tracking clock frequency to close the loop and to generate the track clock to the track module. Thus, the track DVS scheduler 401 dynamically adjusts the track clock to meet tracking performance requirements as specified by the QoM with minimal power consumption.

FIG. 5 shows a block diagram of the processor DVS control module 108 of FIG. 1 implementing DVS to control processor processing according to one or more embodiments of the present disclosure. The processor DVS scheduler 501 determines the desired frequency of the clock to be used by the processor to run the various types of processing. The clock controller frequency to voltage table of 502 generates the desired supply voltage for the processor corresponding to the processor clock frequency. The open loop DC-DC converter 504 uses the desired supply voltage to generate the actual supply voltage to the processor. The actual supply voltage is also used by the ring oscillator 403 to generate the actual clock to the processor.

The processor DVS scheduler 501 dynamically adjusts the desired clock frequency for the processor as a function of executing three main processes—navigation algorithm, baseband processing, and external host interface. Processor clock frequencies for executing the three processes may be estimated separately and then added to the existing processor clock frequency as the processor is called upon to execute the particular process. For example, when the processor receives new tracking measurements, the processor may be executing the navigation algorithm and it is now also called on to perform baseband processing. The processor clock frequency is the sum of the estimated clock frequency for executing the navigation algorithm and the baseband processing. If the external host also requests servicing, the estimated clock frequency for executing the external host interface will also be added to the processor clock frequency. The processor clock frequency for navigation algorithm may be adjusted as a function of performance requirements for the GPS receiver. One such performance requirement is the QoM, the same QoM that is also used by the track DVS scheduler 401 of FIG. 4 to adjust the tracking clock frequency. QoM measures the robustness of the navigation solution generated by the navigation algorithm running on the processor. The processor DVS scheduler 501 may receive a desired QoM to estimate the initial processor clock frequency for running the navigation algorithm. After the processor generates a navigation solution, the processor DVS scheduler 501 may receive a measured QoM based on the navigation solution. The processor DVS scheduler 501 may compare the measured QoM with the desired QoM and make further adjustments in the processor clock frequency for use in executing the navigation algorithm the next time new tracking measurements are received.

The second type of processing the processor performs is executing firmware for servicing events from the baseband and for configuring the baseband. Events from the baseband may include acquisition timeout, acquisition detects, and tracking events such as tracking measurements or loss of lock signals. When the processor receives an acquisition timeout, the processor may configure the acquisition module to search for the same satellite with an increased search time, or may configure the acquisition module to search for a different satellite. When the processor receives an acquisition detect, the processor may configure acquisition module to verify the acquisition or to search for a different satellite, or may configure the track module to verify the acquisition or to track the acquired satellite. When the processor receives tracking events such as a loss of lock, the processor may configure the acquisition module to acquire additional satellites, or may configure the track module to track a new set of satellites or to reacquire satellites that the track module is no longer able to track. The processing requirements for the baseband processing are relatively light compared to that for the navigation algorithm and the processor clock frequency may also be estimated reasonably accurately. The baseband events may also be spaced far apart in time such that even if the processor clock frequency estimates are too low the processor may recover by running for a longer period of time without affecting the overall throughput. In addition, the periodic nature of the tracking events allows flexibility for the processor DVS scheduler 501 to slow down the processor clock to gain further reduction in processor power.

The third type of processing the processor performs is servicing requests from the external host. These may include transferring assisted GPS data for acquisition aiding or servicing general interrupts. Similar to the baseband processing, the processor frequency clock for the external host interface is low and may be estimated reasonably accurately. The output of the processor DVS scheduler 501 is the estimated processor clock frequency.

The estimated processor clock frequency is used as an input to the frequency to voltage look up table in clock controller 502 to generate the desired supply voltage to the processor. The desired supply voltage may be used by the open loop DC-DC converter 504 to generate the processor Vdd to the processor. In a closed loop system in one or more embodiments, there may be an additional ring oscillator 503 where the processor Vdd may also be used by the ring oscillator 503 to generate a clock frequency. The ring oscillator clock may be fed back to the clock controller 502 and compared against the estimated processor clock frequency to close the loop and to generate the processor clock to the processor. Thus, the processor DVS 501 dynamically adjusts the processor clock to meet the various processing requirements of the processor.

As mentioned before, DVS may also be combined with a low power mode to achieve further reduction in power consumption. One such low power mode is the trickle power mode where the baseband runs with a low duty cycle. FIG. 6 shows a timing/processing profile of the acquisition, track and processor modules running DVS in the trickle power mode according to one or more embodiments of the present disclosure. In FIG. 6, the trickle power runs with a frequency of one Hertz. Once every second, the baseband wakes up, activates the clock and raises the supply voltage, runs briefly to generate tracking measurements for the processor to update the navigation solution, then goes to sleep by disabling the clock and lowering the supply voltage. DVS may take advantage of the low baseband duty cycle to reduce clock frequencies and supply voltages to reduce power consumption.

When the baseband wakes up, baseband may initially run acquisition to acquire additional satellites to replace satellites that may no longer be in the field of view. However, the receiver position and velocity is not expected to change significantly in one second from the last navigation solution. In addition, the receiver is likely to have knowledge of the position of the new satellite from the almanac or ephemeris data. Therefore, the code phase/frequency search space for searching the additional satellites should be relatively small and the acquisition may run for less than 100 ms as shown in 601/602. However, to effect further reduction in power, DVS may lengthen the acquisition to run up to 100 ms for a 10% duty cycle by reducing the acquisition clock frequency of 608/609. Reducing the acquisition clock frequency may allow a corresponding reduction in the acquisition Vdd of 606/607. Thus, DVS may yield additional power saving from reducing the acquisition clock and the acquisition Vdd on top of the power reduction resulting from the low duty cycle of the acquisition in the trickle power mode.

After acquisition, baseband may run tracking on some or all of the acquired satellites. Tracking may run for less than 200 ms as shown in 603/604. Similar to the acquisition, however, DVS may lengthen the tracking to run up to 200 ms for a 20% duty cycle by reducing the tracking clock frequency of 612/613. Reducing the tracking clock frequency may allow a corresponding reduction in the tracking Vdd of 610/611. Thus, DVS may yield additional power saving from reducing the tracking clock and the tracking Vdd on top of the power reduction resulting from the low duty cycle of the tracking in the trickle power mode. At the end of tracking, the track module outputs a new set of tracking measurements. The processor runs the navigation algorithm using the tracking measurements to update the navigation solution of 605. Again, DVS may reduce the processor clock frequency of 615 and reduce the corresponding processor Vdd of 614 to reduce processor power. Thus, DVS may adjust duty cycles of acquisition, tracking, and the navigation algorithm in low power operation to reduce overall power consumption of the GPS receiver.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

We claim:

1. A dynamic voltage scaling (DVS) system for a satellite-based navigation receiver comprising:
   an acquisition module adapted to acquire a navigation satellite signal with respect to a code phase/Doppler frequency search space, the acquisition module being clocked at an acquisition clock frequency and powered by an acquisition supply voltage, wherein the acquisition module includes a matched filter adapted to be shared by a plurality of search channels for searching the navigation satellite signal; and
   an acquisition DVS control module adapted to determine and to dynamically adjust a minimum number of search channels responsive to inputs comprising performance requirements for the acquisition module, operating conditions of the satellite-based navigation receiver, and a status from the acquisition module, and wherein the acquisition DVS control module is further adapted to dynamically scale the acquisition clock frequency to correspond to the minimum number of search channels and to adjust the acquisition supply voltage to correspond to the acquisition clock frequency.

2. The DVS system of claim 1, wherein the performance requirements for the acquisition module comprise an acquisition time to acquire the navigation satellite signal for a navigation solution wherein the acquisition time is allocated from a Time-to-First-Fix (TTFF) requirement.

3. The DVS system of claim 1, wherein the operating conditions of the satellite-based navigation receiver comprise:
   amount of code phase uncertainty for each of the satellites;
   amount of frequency uncertainty for each of the satellites;
   availability of ephemeris data;
   availability of almanac data; and
   availability of host aiding information.

4. The DVS system of claim 1, wherein the status from the acquisition module comprises:
   a status to indicate failure to acquire a satellite signal within an acquisition time allocated for the satellite signal; and
   a status to indicate successful acquisition of the satellite signal within the acquisition time allocated for the satellite signal.

5. The DVS system of claim 1, wherein the acquisition DVS control module is further adapted to dynamically determine the acquisition clock frequency responsive to a search strategy algorithm comprising:
   a search sequence of a plurality of navigation satellites signals;
   requirements for acquisition verification of any navigation satellite signals acquired; and
   requirements for recovery action of any navigation satellite signals not acquired.

6. The DVS system of claim 1, wherein the acquisition module is further adapted to verify acquisition of a navigation satellite signal, the acquisition DVS control module is further adapted to dynamically determine a verification clock frequency used to verify acquisition of the navigation satellite signal, and the acquisition clock frequency is incremented by the verification clock frequency.

7. The DVS system of claim 1, wherein the acquisition module is further adapted to reacquire a navigation satellite signal that can not be tracked by a track module in a reacquisition process, the acquisition DVS control module is further adapted to dynamically determine a reacquisition clock frequency used to reacquire the navigation satellite signal, and the acquisition clock frequency is incremented by the reacquisition clock frequency.

8. The DVS system of claim 7, wherein the acquisition DVS control module is further adapted to dynamically determine the reacquisition clock frequency responsive to inputs comprising:
   operating conditions of the satellite-based navigation receiver; and
   a status of the reacquisition process.

9. The DVS system of claim 1, wherein the acquisition DVS control module generates the acquisition supply voltage and the acquisition clock frequency in an open loop system comprising:
   a clock controller adapted to generate the acquisition clock frequency;
   a frequency to voltage look up table adapted to determine a desired acquisition supply voltage based on the acquisition clock frequency; and an open loop DC-DC converter adapted to generate the acquisition supply voltage based on the desired acquisition supply voltage.

10. The DVS system of claim 1, wherein the acquisition DVS control module generates the acquisition supply voltage and the acquisition clock frequency in a closed loop system comprising:
a clock controller adapted to generate the acquisition clock frequency responsive to a ring oscillator clock;
a frequency to voltage look up table adapted to determine a desired acquisition supply voltage based on the acquisition clock frequency;
an open loop DC-DC converter adapted to generate the acquisition supply voltage based on the desired acquisition supply voltage; and
a ring oscillator adapted to generate the ring oscillator clock based on the acquisition supply voltage.

11. The DVS system of claim 1, wherein the acquisition DVS control module is further adapted to generate in a low duty cycle the acquisition clock frequency and the acquisition supply voltage.

12. The DVS system of claim 1, wherein the acquisition DVS control module is further adapted to dynamic adjust the acquisition supply voltage and the acquisition clock frequency with a granularity of adjustment that is variable.

13. A dynamic voltage scaling (DVS) system for a satellite-based navigation receiver comprising:
a track module adapted to track a plurality of acquired navigation satellite signals, the track module being clocked at a track clock frequency and powered by a track supply voltage, wherein the track module includes a matched filter adapted to be shared by a plurality of tracking channels far tracking the plurality of navigation satellite signals; and
a track DVS control module adapted to determine and to dynamically adjust a minimum number of tracking channels responsive to inputs comprising performance requirements for the track module, operating conditions of the satellite-based navigation receiver, and a status from the track module, and wherein the track DVS control module is further adapted to dynamically scale the track clock frequency to correspond to the minimum number of tracking channels and to adjust the track supply voltage to correspond to the track clock frequency.

14. The DVS system of claim 13, wherein the performance requirements for the track module comprise a required number of tracked satellites wherein the required number of tracked satellites is determined from a quality of measurement (QoM) requirement of a navigation solution.

15. The DVS system of claim 13, wherein the operating conditions of the satellite-based navigation receiver comprise a low power mode wherein the low power mode operates the track module in a low duty cycle.

16. The DVS system of claim 13, wherein the operating conditions of the satellite-based navigation receiver comprise a measurement of a ratio of carrier power of the navigation satellite signal to noise power.

17. The DVS system of claim 13, wherein the operating conditions of the satellite-based navigation receiver comprise code phase measurements of the navigation satellite signal.

18. The DVS system of claim 13, wherein the operating conditions of the satellite-based navigation receiver comprise carrier frequency measurements of the navigation satellite signal.

19. The DVS system of claim 13, wherein the status from the track module comprises a status to indicate that a navigation satellite signal can not be tracked.

20. The DVS system of claim 13, wherein the track module is further adapted to verify acquisition of a navigation satellite signal, the track DVS control module is further adapted to dynamically determine a verification clock frequency used to verify acquisition of the navigation satellite signal, and the track clock frequency is incremented by the verification clock frequency.

21. The DVS system of claim 13, wherein the track module is further adapted to reacquire a navigation satellite signal that can not be tracked by the track module in a reacquisition process, the track DVS control module is further adapted to dynamically determine a reacquisition clock frequency used to reacquire the navigation satellite signal, and the track clock frequency is incremented by the reacquisition clock frequency.

22. The DVS system of claim 21, wherein the track DVS control module is further adapted to dynamically determine the reacquisition clock frequency responsive to inputs comprising:
operating conditions of the satellite-based navigation receiver; and
a status of the reacquisition process.

23. The DVS system of claim 13, wherein the track DVS control module generates the track supply voltage and the track clock frequency in an open loop system comprising:
a clock controller adapted to generate the track clock frequency;
a frequency to voltage look up table adapted to determine a desired track supply voltage based on the track clock frequency; and
an open loop DC-DC converter adapted to generate the track supply voltage based on the desired track supply voltage.

24. The DVS system of claim 13, wherein the track DVS control module generates the track supply voltage and the track clock frequency in a closed loop system comprising:
a clock controller adapted to generate the track clock frequency responsive to a ring oscillator clock;
a frequency to voltage look up table adapted to determine a desired track supply voltage based on the track clock frequency;
an open loop DC-DC converter adapted to generate the track supply voltage based on the desired track supply voltage; and
a ring oscillator adapted to generate the ring oscillator clock based on the track supply voltage.

25. The DVS system of claim 13, wherein the track DVS control module is further adapted to generate in a low duty cycle the track clock frequency and the track supply voltage.

26. The DVS system of claim 13, wherein the track DVS control module is further adapted to dynamic adjust the track supply voltage and the track clock frequency with a granularity of adjustment that is variable.

27. A dynamic voltage scaling (DVS) system for a satellite-based navigation receiver comprising:
a processor adapted to receive measurements from a track module, to execute a navigation algorithm to generate a navigation solution, and to calculate a measured performance metric from the navigation solution, the processor being clocked at a processor clock frequency and powered by a processor supply voltage; and
a processor DVS control module adapted to determine a minimum processor clock frequency responsive to performance requirements for the navigation solution, to monitor the measured performance metric, and to dynamically adjust the minimum processor clock frequency so as to minimize a difference between the performance requirements and the measured performance metric, and wherein the processor DVS control module is further adapted to adjust the processor supply voltage to correspond to the minimum processor clock frequency.

28. The DVS system of claim 27, wherein the performance requirements for the navigation solution comprise a required quality of measurement (QoM) of the navigation solution, and wherein the measured performance metric comprises a measured QoM.

29. The DVS system of claim 27, wherein the processor is further adapted to execute baseband processing, the processor DVS control module is further adapted to dynamically determine a baseband processing clock frequency used to execute the baseband processing responsive to estimated baseband processing requirements, and the processor clock frequency is incremented by the baseband processing clock frequency.

30. The DVS system of claim 27, wherein the processor is further adapted to execute processing to interface with a host processor, the processor DVS control module is further adapted to dynamically determine a host interface processing clock frequency used to execute the processing to interface with the host processor responsive to estimated host interface processing requirements, and the processor clock frequency is incremented by the host interface processing clock frequency.

31. The DVS system of claim 27, wherein the processor DVS control module generates the processor supply voltage and the processor clock frequency in an open loop system comprising:
  a clock controller adapted to generate the processor clock frequency;
  a frequency to voltage look up table adapted to determine a desired processor supply voltage based on the processor clock frequency; and
  an open loop DC-DC converter adapted to generate the processor supply voltage based on the desired processor supply voltage.

32. The DVS system of claim 27, wherein the processor DVS control module generates the processor supply voltage and the processor clock frequency in a closed loop system comprising:
  a clock controller adapted to generate the processor clock frequency responsive to a ring oscillator clock;
  a frequency to voltage look up table adapted to determine a desired processor supply voltage based on the processor clock frequency;
  an open loop DC-DC converter adapted to generate the processor supply voltage based on the desired processor supply voltage; and
  a ring oscillator adapted to generate the ring oscillator clock based on the processor supply voltage.

33. The DVS system of claim 27, wherein the processor DVS control module is further adapted to generate in a low duty cycle the processor clock frequency and the processor supply voltage.

34. The DVS system of claim 27, wherein the processor DVS control module is further adapted to dynamic adjust the processor supply voltage and the processor clock frequency with a granularity of adjustment that is variable.

35. A method for dynamically reducing power consumption in a satellite-based navigation receiver that has a plurality of search channels clocked by an acquisition clock and powered by an acquisition supply voltage, the method comprising:
  deriving an allocated acquisition time for acquiring a navigation satellite signal in an acquisition process from performance requirements of the satellite-based navigation receiver;
  calculating a code phase/Doppler frequency search space responsive to operating conditions for searching the navigation satellite signal;
  determining a minimum number of search channels for searching the navigation satellite signal from the allocated acquisition time and the code phase/Doppler frequency search space;
  scaling a frequency of the acquisition clock to correspond to the minimum number of search channels;
  generating the acquisition supply voltage to correspond to the frequency of the acquisition clock;
  monitoring a status of the acquisition process to generate an adjusted allocated acquisition time;
  adjusting dynamically the minimum number of search channels from the adjusted allocated acquisition time; and
  repeating said scaling a frequency of the acquisition clock and said generating the acquisition supply voltage.

36. The method of claim 35, wherein the performance requirements for deriving the allocated acquisition time comprise the Time-to-First-Fix (TTFF) requirement for the satellite-based navigation receiver.

37. The method of claim 35, wherein said calculating the code phase/Doppler frequency search space responsive to operating conditions for searching the navigation satellite signal comprises:
  determining availability of ephemeris data;
  determining availability of almanac data;
  determining availability of aiding information from a host;
  determining amount of code phase uncertainties for the navigation satellite signal; and
  determining amount of frequency uncertainties for the navigation satellite signal.

38. The method of claim 35, wherein said monitoring the status of the acquisition process to adjust the allocated acquisition time comprises:
  monitoring a status indicating the acquisition process fails to acquire a satellite signal within an acquisition time allocated for the satellite signal; and
  monitoring a status indicating the acquisition process acquires the satellite signal within the acquisition time allocated for the satellite signal.

39. The method of claim 35, wherein said adjusting dynamically the minimum number of search channels comprises:
  determining a strategy for acquisition verification when the acquisition process acquires the navigation satellite signal; and
  estimating the minimum number of search channels for performing acquisition verification for the navigation satellite signal within the adjusted allocated acquisition time.

40. The method of claim 35, wherein said adjusting dynamically the minimum number of search channels comprises:
  determining a recovery action when the acquisition process fails to acquire the navigation satellite signal; and
  estimating the minimum number of search channels for performing the recovery action for the navigation satellite signal within the adjusted allocated acquisition time.

41. The method of claim 39, wherein said determining a strategy for acquisition verification when the acquisition process acquires the navigation satellite signal comprises:
- deriving an allocated verification time for verifying acquisition of the navigation satellite signal in a verification process;
- calculating a verification code phase/Doppler frequency search space responsive to operating conditions for verifying acquisition of the navigation satellite signal;
- monitoring a status of the verification process to generate an adjusted allocated verification time and an adjusted verification code phase/Doppler frequency search space from the allocated verification time and the verification code phase/Doppler frequency search space; and
- estimating processing requirements of the verification process responsive to the adjusted allocated verification time and the adjusted verification code phase/Doppler frequency search space.

42. The method of claim 35, further comprising an reacquisition process, wherein the reacquisition process comprises:
- receiving a loss of lock signal from a track process indicating the track process can no longer track a navigation satellite signal;
- calculating a reacquisition code phase/Doppler frequency search space responsive to operating conditions for reacquiring the navigation satellite signal;
- monitoring a status of the reacquisition process to generate an adjusted reacquisition code phase/Doppler frequency search space from the reacquisition code phase/Doppler frequency search space;
- estimating a reacquisition minimal number of search channels for the reacquisition process responsive to the adjusted reacquisition code phase/Doppler frequency search space; and
- incrementing the minimum number of search channels with the reacquisition minimal number of search channels.

43. The method of claim 35, further comprising operating the acquisition clock and the acquisition supply voltage with a low duty cycle in a low power mode.

44. The method of claim 35, wherein said adjusting dynamically the minimum number of search channels is performed with a granularity of adjustment that is variable.

45. A method for dynamically reducing power consumption in a satellite-based navigation receiver that has a plurality of tracking channels clocked by a track clock and powered by a track supply voltage, the method comprising:
- determining a minimum number of tracking channels for tracking a plurality of acquired navigation satellite signals in a track process from a quality of measurement (QoM) requirement of a navigation solution;
- scaling a frequency of the track clock to correspond to the minimum number of tracking channels;
- generating the track supply voltage to correspond to the frequency of the track clock;
- updating dynamically the minimum number of tracking channels responsive to operating conditions of the satellite-based navigation receiver and a status of the track process; and
- repeating said scaling a frequency of the track clock and said generating the track supply voltage.

46. The method of claim 45, further comprising operating the track clock and the track supply voltage with a low duty cycle in a low power mode.

47. The method of claim 45, wherein the operating conditions of the satellite-based navigation receiver for updating the minimum number of tracking channels comprises a ratio of carrier power of a navigation satellite signal to noise power density.

48. The method of claim 45, wherein the operating conditions of the satellite-based navigation receiver for updating the minimum number of tracking channels comprises code phase measurements of a navigation satellite signal.

49. The method of claim 45, wherein the operating conditions of the satellite-based navigation receiver for updating the minimum number of tracking channels comprises carrier frequency measurements of a navigation satellite signal.

50. The method of claim 45, wherein the status of the track process for updating the minimum number of tracking channels comprises a loss of lock signal from the track process indicating the track process can no longer track a navigation satellite signal.

51. The method of claim 45, wherein said updating dynamically the minimum number of tracking channels is performed with a granularity of adjustment that is variable.

52. A method for dynamically reducing power consumption in a satellite-based navigation receiver that has a processor clocked by a processor clock and powered by a processor supply voltage, the method comprising:
- estimating a minimal navigation algorithm clock frequency to clock the processor for executing a navigation algorithm to generate a navigation solution responsive to a required quality of measurement (QoM) of the navigation solution;
- estimating a minimal baseband processing clock frequency to clock the processor for executing baseband processing responsive to requests from a baseband;
- estimating a minimal host interface processing clock frequency to clock the processor for executing host interface processing responsive to requests from a host processor;
- summing the minimal navigation algorithm clock frequency, the minimal baseband processing clock frequency, and the minimal host interface processing clock frequency to generate a minimal frequency of the processor clock;
- generating the processor supply voltage to correspond to the minimal frequency of the processor clock;
- calculating a measured QoM from the navigation solution;
- adjusting dynamically the minimal frequency of the processor clock so as to minimize a difference between the required QoM and the measured QoM; and
- repeating said summing, said generating, said calculating, and said adjusting.

53. The method of claim 52, further comprising operating the processor clock and the processor supply voltage with a low duty cycle in a low power mode.

54. The method of claim 52, wherein said adjusting dynamically the minimal frequency of the processor clock is performed with a granularity of adjustment that is variable.

* * * * *